April 14, 1931.　　H. D. LATHROP　　1,800,648
VALVE OPERATING DEVICE
Filed April 13, 1928
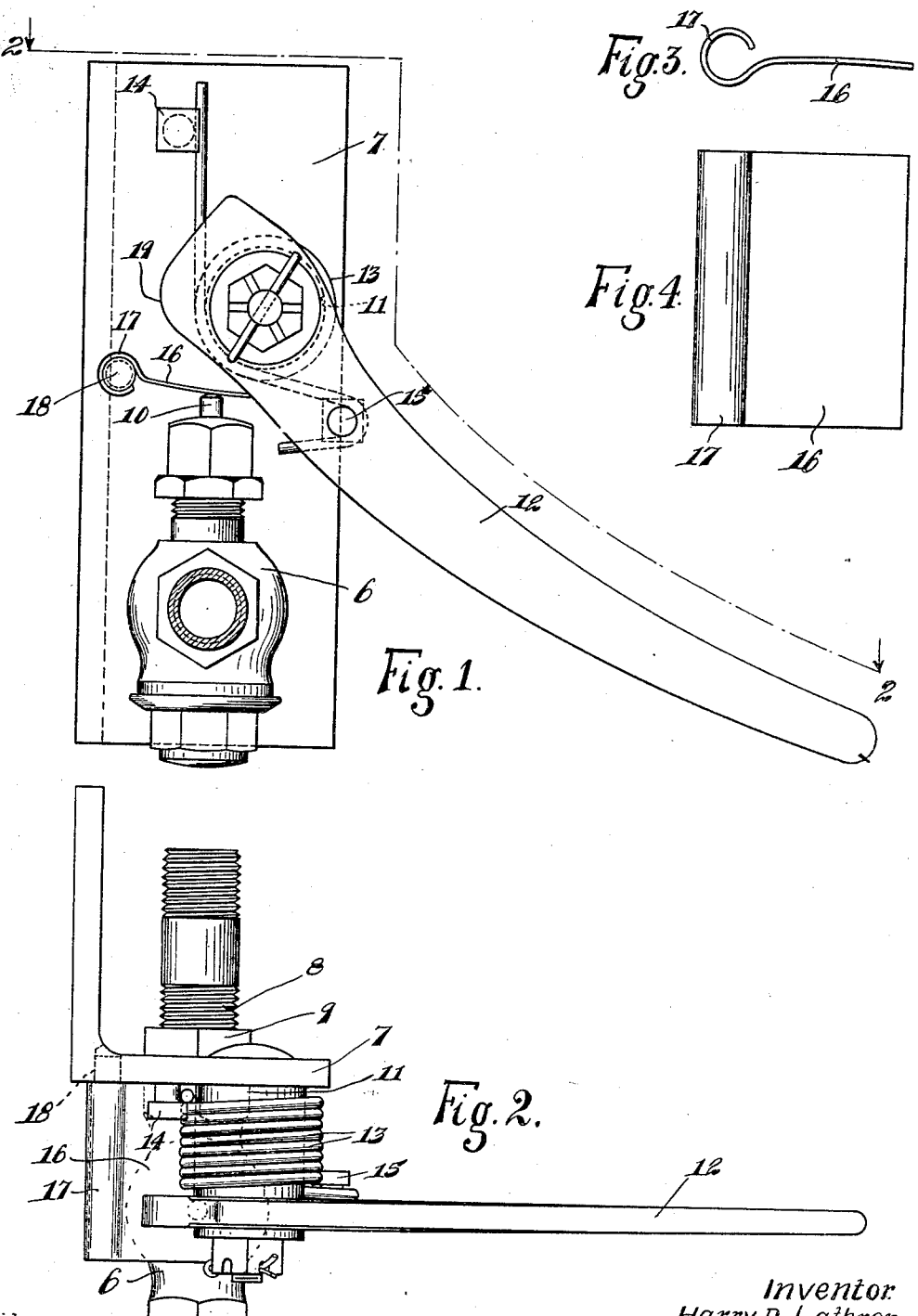
Witnesses:
K. W. Finkel
F. C. Appleton
Inventor
Harry D. Lathrop,
By Joshua R. H. Potk
His Attorney.

Patented Apr. 14, 1931

1,800,643

UNITED STATES PATENT OFFICE

HARRY D. LATHROP, OF CHICAGO, ILLINOIS

VALVE-OPERATING DEVICE

Application filed April 13, 1928. Serial No. 269,708.

This invention relates to a valve operating device and has for its object the provision of means for permitting the prolonged intermittent operation of a valve or similar mechanism with a minimum amount of wear upon the permanent parts.

Other objects will appear hereinafter.

The invention consists in the combinations and arrangements of parts hereinafter described and claimed.

The invention will be best understood by reference to the accompanying drawings forming a part of the specification, and in which:

Fig. 1 is a plan view showing a valve mounted upon a bracket and the valve operating mechanism associated therewith;

Fig. 2 is a view taken on the line 2—2 of Fig. 1;

Fig. 3 is an edge view of the plate adapted to be interposed between the valve and the operating lever; and Fig. 4 is a face view of the plate shown in Fig. 3.

The invention is particularly designed for use in connection with a valve in which the opening stem has a longitudinal or reciprocal motion and which is operated by a lever having a cam portion which causes depression of the valve stem upon swinging of the lever. Continued use of a device of this kind where the cam lever has direct contact with the valve stem, causes undue wear upon the end of the stem which bears against the cam surface and a groove is often worn upon the cam surface by the frictional engagement with the valve stem. When this occurs an unevenness of operation results and in time it is necessary to replace the valve stem and operating lever.

To overcome this difficulty, in the preferred embodiment illustrated, an inexpensive pivoted plate is interposed between the valve stem and the valve operating lever in such a manner that friction upon the valve stem is reduced to a minimum and the greater part of such wear as is unavoidable takes place upon the interposed plate. This plate is preferably constructed of tin alloy or other cheap metal so as to permit of replacement at negligible expense and, if desired, the plate may be constructed of metal slightly softer than the valve stem and operating lever so that practically the entire wear will occur upon the plate.

The preferred embodiment comprises a valve 6 which is shown mounted upon bracket 7, L-shaped in cross section. A nipple 8, which is threaded into one of the valve connections, extends through an opening in the bracket 7 and carries lock nut 9 which serves to hold the valve securely in place. As stated, valve 6 is preferably of the longitudinally moving stem type in which depression of stem 10 causes opening of the valve, although it will be obvious that other types of valves may be employed.

Secured to bracket 7 is an enlarged post 11 having a reduced outer end upon which is pivotally mounted lever 12. To maintain lever 12 normally in the position shown in Fig. 1, a spring 13 is coiled upon post 11. One end of spring 13 bears against lug 14 mounted upon the bracket 7 and the other end engages lug 15 secured to handle 12.

A plate 16 preferably has one edge formed into a loop 17 adapted to make a sliding fit upon post 18 secured to bracket 7 and the flat portion of the plate is adapted to ride upon the end of valve stem 10. The operating face 19 of lever 12 is formed to exert a camming action upon the plate 16 and consequently cause depression of the valve stem 10 when lever 12 is swung in a counter-clockwise direction in the position shown in Fig. 1. Because of the angle at which plate 16 is disposed relative to stem 10, friction between these two parts upon repeated operation of lever 12 is reduced to a minimum and because plate 16 presents a flat surface against the operating face 19 of lever 12 the wear is evenly distributed upon the latter. As plate 16 becomes worn, it may be reversed or its position changed by interposing a washer upon the post 18 between the plate and the bracket 7.

The arrangement shown is particularly adapted for use in connection with machines such as can washing or bottle washing machines in which projecting lugs or the objects operated upon contact with and swing the valve operating lever for intermittently opening and closing a steam or washing fluid valve as the objects are transported through the machine upon a conveyor carriage. In machines of this character excessive wear upon the valve and lever parts is obviated and when plate 16 is composed of material of less hardness than those parts, practically the entire wear is upon the plate which may be adjusted or replaced as desired. Further, transmission of wear to the plate 16 insures evenness of operation because the lever contacting surface 19 and valve stem 10 retain their original forms.

While I have illustrated and described the preferred form of construction for carrying my invention into effect, it is capable of variation and modification without departing from the spirit of the invention. I, therefore, do not wish to be limited to the precise details of construction set forth, but desire to avail myself of such variations and modifications as come within the scope of the appended claims.

Having described my invention, what I claim as new and desire to secure by Letters Patent is:

1. The combination of a valve having an operating stem, a lever pivotally mounted adjacent said stem and adapted to cause the actuation of said stem, a post adjacent said stem, and a plate pivotally mounted upon said post and adapted to be interposed between said stem and said lever, said plate composed of a piece of metal having one edge curved to form a loop adapted to slidably fit upon said post, whereby the position of said plate may be reversed or shifted upon said post.

2. The combination of a valve having an operating stem, a lever pivotally mounted adjacent said stem and adapted to cause the actuation of said stem, a post adjacent said stem, and a plate pivotally mounted upon said post and adapted to be interposed between said stem and said lever, said plate composed of a piece of metal having one edge curved to form a loop adapted to slidably fit upon said post, whereby the position of said plate may be reversed or shifted upon said post, and said plate composed of material of less hardness than the contacting parts, whereby to absorb the wear incident to operation of the parts.

In testimony whereof I have signed my name to this specification.

HARRY D. LATHROP.